No. 850,734. PATENTED APR. 16, 1907.
A. J. CRANDALL.
MACHINE FOR REELING TWINE.
APPLICATION FILED AUG. 3, 1905.
4 SHEETS—SHEET 2.
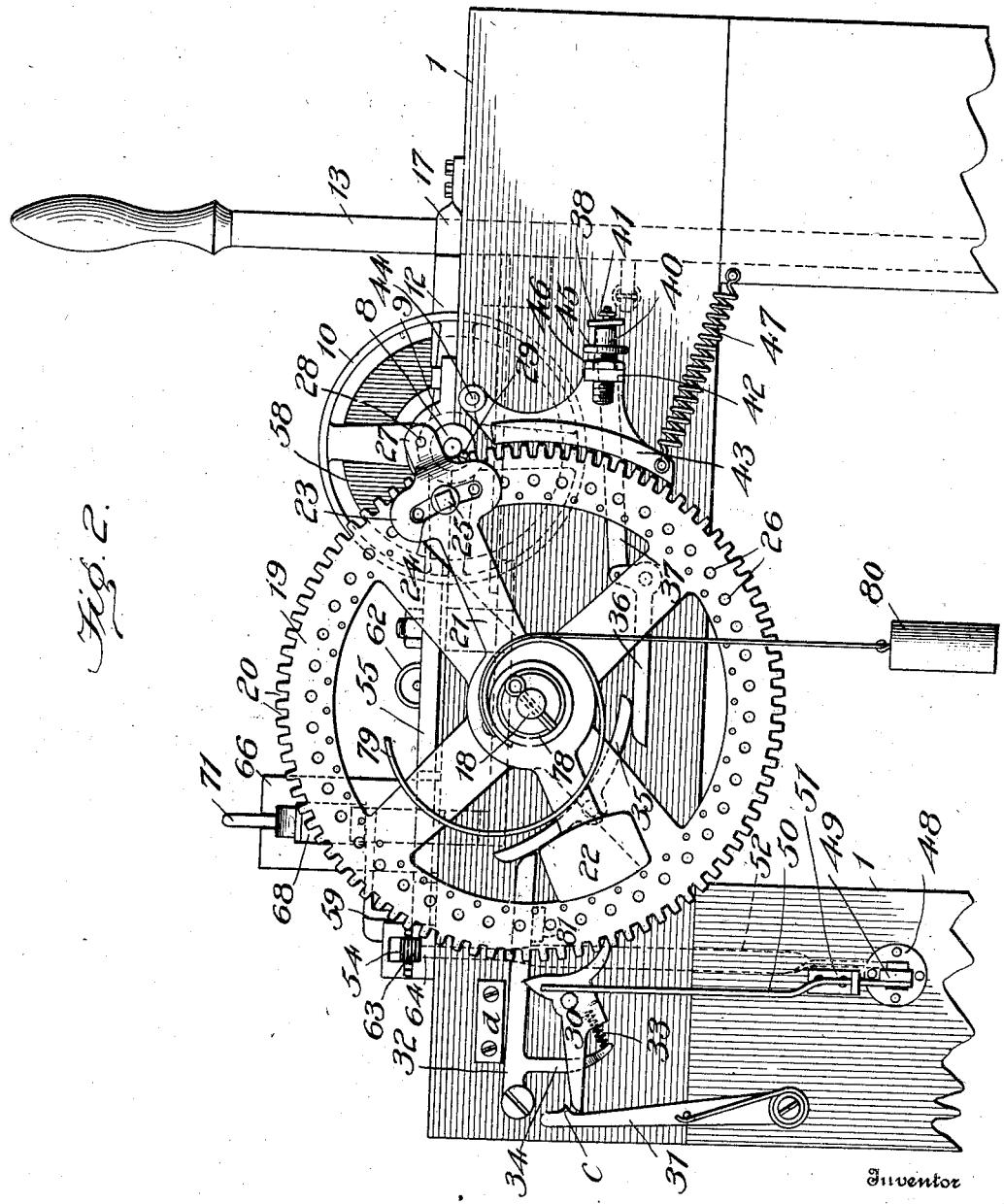
Witnesses
Edwin L. Bradford
Ralph Wormelle
Inventor
A. J. Crandall
By J. R. Nottingham
Attorney

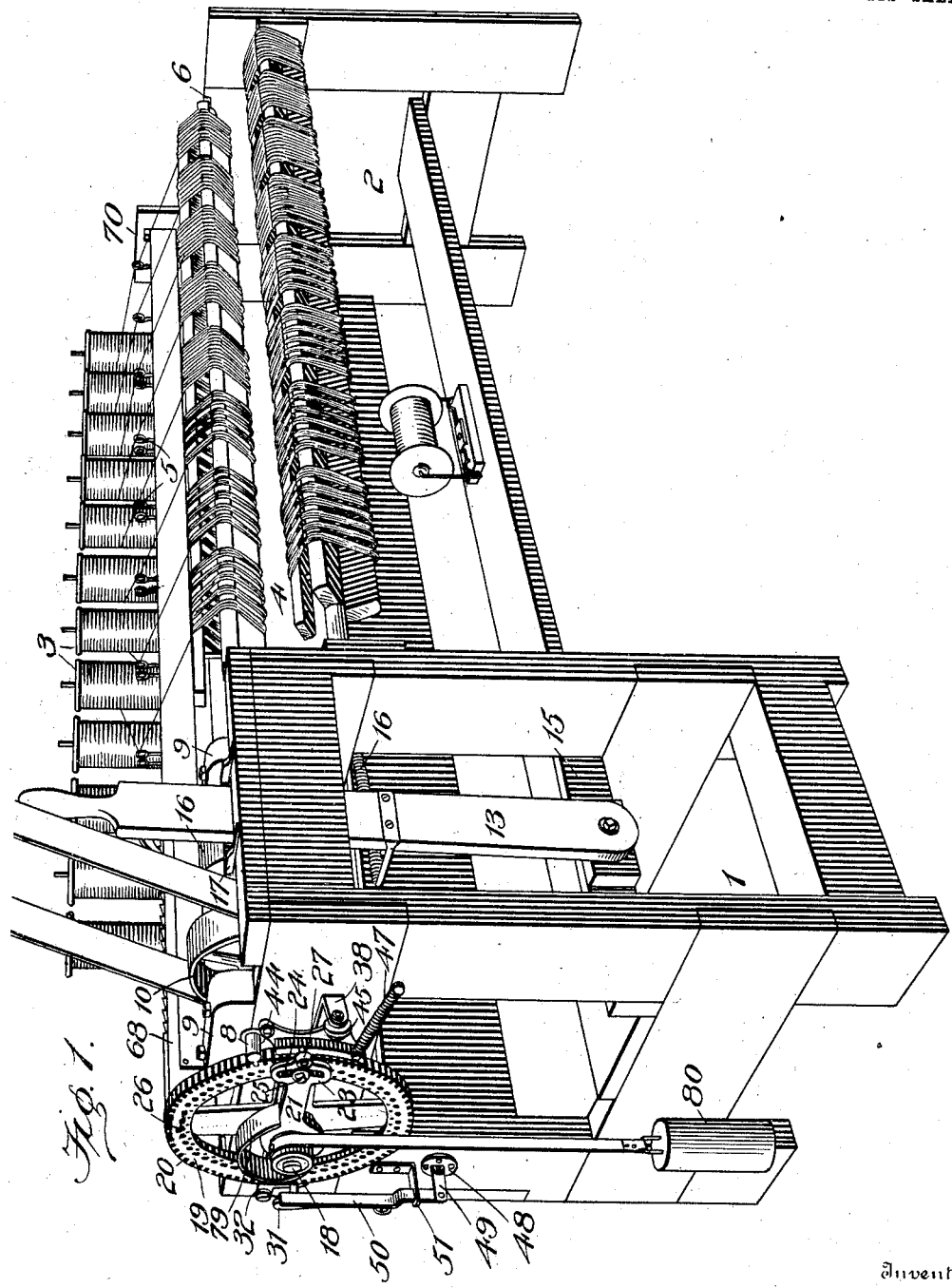

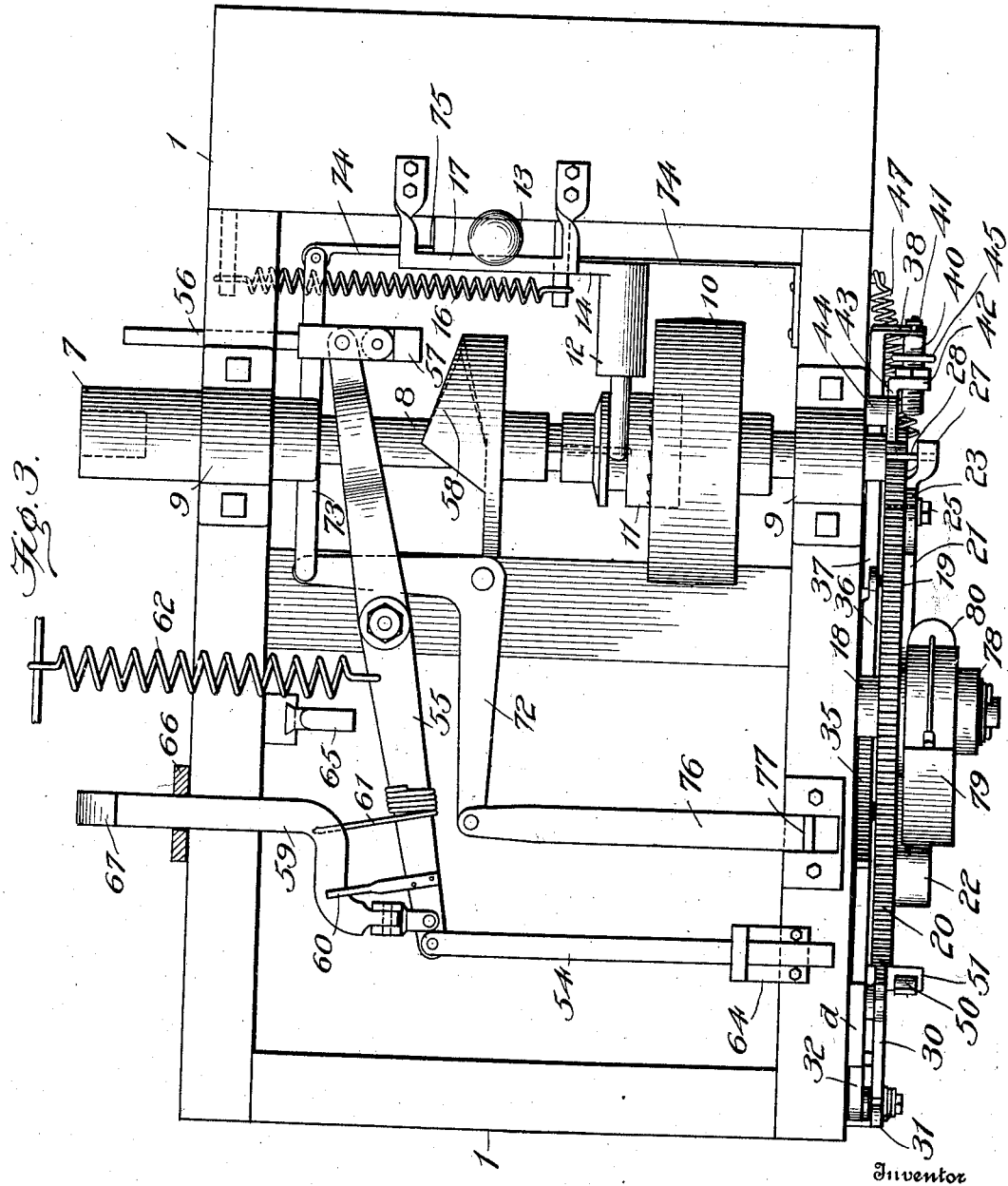

No. 850,734. PATENTED APR. 16, 1907.
A. J. CRANDALL.
MACHINE FOR REELING TWINE.
APPLICATION FILED AUG. 3, 1905.
4 SHEETS—SHEET 4.
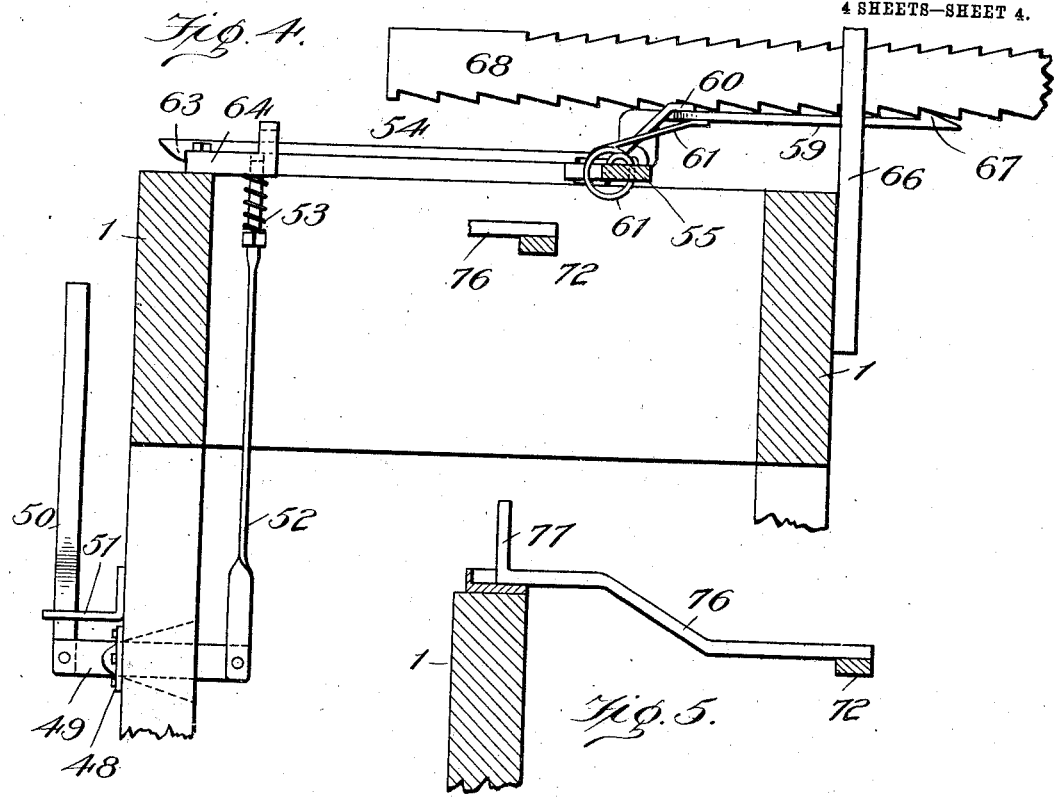
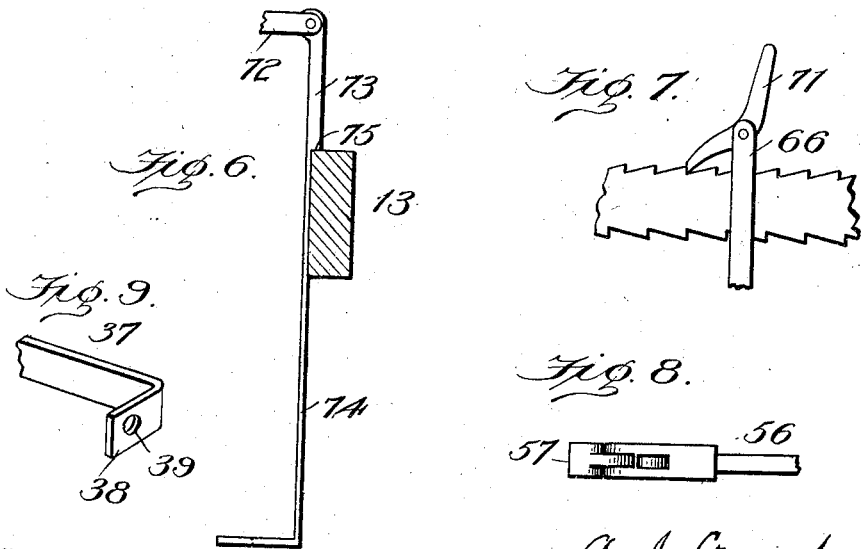
Witnesses
Edwin L. Bradford
Ralph Worinelle
Inventor
A. J. Crandall
By J. R. Nottingham
Attorney

UNITED STATES PATENT OFFICE.

ALSTON JULIAN CRANDALL, OF ASHAWAY, RHODE ISLAND.

MACHINE FOR REELING TWINE.

No. 850,734.　　　Specification of Letters Patent.　　　Patented April 16, 1907.

Application filed August 3, 1905. Serial No. 272,515.

*To all whom it may concern:*

Be it known that I, ALSTON JULIAN CRANDALL, a citizen of the United States, residing at Ashaway, in the county of Washington and State of Rhode Island, have invented certain new and useful Improvements in Machines for Reeling Twine; and I do hereby declare the following to be a full, clear, and exact description of the invention, such as will enable others skilled in the art to which it appertains to make and use the same.

This invention relates to machines for reeling twine; and it consists of the novel construction and arrangement of the several parts and their general combination, as will be hereinafter fully described in this specification, and briefly stated in the claims.

The principal object of the invention is to simplify and cheapen the cost of production of this type of machine without impairing its durability and its efficiency in operation.

Other objects of the invention will become apparent upon a more detailed description thereof.

In the drawings, Figure 1 is a perspective view of my improved machine; Fig. 2, an end elevation; Fig. 3, a top plan view, a portion being broken away; Fig. 4, a detail view of the spacing-bar and operating mechanism; Figs. 5, 6, 7, 8, and 9, detail views.

In the several views the numeral 1 indicates the frame supporting the operating mechanism, and 2 the frame supporting the spools 3 and the reel 4. The spools on which the twine to be coiled is wound are mounted on suitable spindles situated at the rear part of the frame 2, and suitable guides 5 are provided for guiding the twine to the reel. While the number of spools employed is usually eight, yet it will be evident that a greater or lesser number may be employed, according to the fineness or coarseness of the twine to be reeled.

One end of the reel 4 is supported or journaled in a half-bearing 6, secured on the end of the frame 2, and the other end in a square socket of a head 7, secured to one end of the driving-shaft 8, said driving-shaft being journaled in bearings 9 9, secured on the frame 1. Secured on the driving-shaft by any wellknown means is a band-pulley 10, and slidably mounted on said shaft is a clutch 11, adapted to be operated by a clutch-shifter 12, pivoted to an operating-lever 13 by an arm 14. The operating-lever is pivoted to a cross-bar 15 of the frame 1 and is held normally restrained by a spring 16, the "throw" of said operating-lever being limited in either direction by a stirrup 17, secured to the frame. The engagement of the clutch with the band-pulley is effected by hand; but the disengagement is effected automatically, as will be hereinafter explained.

Mounted loosely on a short shaft 18, secured on the end of the frame 1, is a counting-wheel 19, having its periphery provided with teeth 20, and loosely mounted on the hub of the shaft 18 is a counting-arm 21, having a weighted end 22 and a head 23 provided with a slot 24. Operating through the slot 24 is a set-screw 25, which is adapted to engage any one of an annular row of screwthreaded perforations 26 to fasten the counting-arm to the counting-wheel. The counting-arm head is provided with an outwardlybent extension 27, carrying a pin 28, the purpose of which will be hereinafter explained. The outer end of the driving-shaft is provided with a tooth 29, which is adapted to engage the teeth in the counting-wheel and at each revolution of said shaft move said counting-wheel one tooth.

Pivoted on the frame 1 is a counting-pawl 30, which is arranged to engage the teeth of the counting-wheel to prevent the rotation of said wheel in a reverse direction until released by the pin 28 coming in contact with it. The counting-pawl is held in engagement with the counting-wheel by means of a spring-pressed arm 31, pivoted on the frame 1, as shown in Fig. 2. Pivoted on the frame 1 is brake-lever 32, held in normal position by a spring 33, which has one end attached to a downwardly-extending arm 34 and the other end seated in a socket in the counting-ratchet. The free end of the brakelever is adapted to operate against one arm of a two-arm pawl 35, pivoted on the frame 1, the other arm of the pawl being adapted to operate against the free end of one arm of a bell-crank lever 36, the other arm of said bellcrank lever being pivotally attached to one end of a push-bar 37. The other end of the push-bar is bent outwardly at right angles to form a lip 38, which is provided with a slot 39, through which extends the reduced end portion of an adjustable set-screw 40, said reduced end being supported in an eye 41, fixed in the frame 1, as shown in Fig. 2. The set-screw operates in a lug 42, projecting outwardly from a brake-shoe 43, pivoted on the frame 1 at 44, and is provided with a milled head 45. The set-screw is held in adjusted position by a jam-nut 46, and the brake-shoe may be adjusted to bear against the periphery of the counting-wheel with a greater or lesser pressure to prevent the recoil of the counting-wheel when brought back to normal or starting position. A coil-spring 47, having one end attached to the free end of the brake-shoe and the other end attached to the frame 1, serves to normally hold said shoe out of contact with the counting-wheel.

Secured to the frame 1 is a bracket 48, between the ears of which is pivoted or fulcrumed an oscillating bar 49. To the outer end of the bar 49 is pivotally attached a vertical brake-operating bar 50, operating through a guide 51, and pivotally attached to the other end of the oscillatory bar, which passes inwardly through a slot in the frame, is a vertical lifting-bar 52, which is held in its normal (downward) position by a coil-spring 53. The upper end of the lifting-bar sets under a horizontal latch 54, which is pivoted to one end of a horizontally-fulcrumed lever 55, the other end of said lever being pivotally attached to a horizontally-reciprocatory rod 56. The rod 56 is provided with an upwardly-extending projection 57, which is adapted to be engaged by a cam 58, mounted on the driving-shaft. Hinged to one end of the lever 55 is a horizontal latch 59, which is held pressed up against a guide-arm 60, projecting from the lever 55, by an arm of a spring 61, fastened to said lever. The lever 55 is held normally restrained against the tension force of a spring 62 by the latch 54, which has its free end provided with a hook 63, adapted to engage a catch-plate 64, secured to the frame until released by the operation of the vertical lifting-bar 52. When released, the force of the spring 62 will pull the outer or rear end of the lever 55 against a right-angle spacer-stop 65, which has one arm set in a groove or socket in the frame 1.

The free end of the hinged latch 59 operates in a guide 66 and is provided with an upwardly-extending lip 67, adapted to engage the teeth on the under side of a space-bar 68. The space-bar is supported in guides 69 and 70, secured on the frame 2, and is held against longitudinal movement in one direction by means of a hand-operated pawl 71, pivoted between the arms of the guide 69.

Pivoted to the frame 1 at any convenient place is a bell-crank lever 72, and pivotally connected to one arm of said lever is one end of a link 73, the other end of the link being pivoted to a spring-arm 74. The free end of the spring-arm is bent at right angles and fastened to the frame. The spring-arm is provided with a stop 75, which is adapted to engage one edge of the operating-lever to prevent it being prematurely thrown by the tension force of the spring 16, and thereby disengage the clutch from the band-pulley. The other arm of the bell-crank lever 72 is pivotally connected to a stop-arm 76, which is provided with an upturned lip 77, against which the inner end of the space-bar presses when the required number of coils have been wound.

In order to increase the speed of the counting-wheel in returning to normal or starting position, I attach to the hub of the counting-wheel by means of a stud or post 78 a curved guide 79 and suspend from the stud or post a weight 80. As the counting-wheel revolves to wind the required number of coils the strap by which the weight is suspended will be wound upon the curved guide 79 and the weight carried away from the axis of said wheel, so that when the counting-pawl is caused to release the counting-wheel the said wheel will be rapidly returned to normal or starting position.

The operation of reeling the twine is as follows: The spools of twine being placed on the spindles and the ends brought through and fastened in any suitable manner to the reel the spacer-bar is placed in proper position. If six coils are to be wound to each line, a space of one inch apart will be required, and the teeth on the bottom and top of the spacer-bar must also be one inch apart and a one-inch spacer-stop used. If the length of line desired requires, say, thirty revolutions of the reel, the counting-arm is set at the thirtieth tooth of the counting-wheel and fastened by the set-screw 25. The machine being ready, it is started by throwing the operating-lever in the direction to cause the clutch to engage the band-pulley. As the lever is thrown the stop 75 springs in front of the edge of said lever, as shown in Fig. 3, and prevents it from becoming accidentally displaced. At each revolution of the driving-shaft the tooth 29 will rotate the counting-wheel one tooth, the pawl 30 preventing the counting-wheel from slipping back. After the driving-shaft, and consequently the reel, has made the thirtieth revolution the pin 28 will engage the counting-pawl and force said pawl out of engagement with the counting-wheel, releasing the same to the action of the weight 80. As the counting-wheel returns to its normal or starting position a lug 81 on the back of said wheel is forcibly brought up against the brake-lever 32, elevating its free end and causing its lower arm of the pawl 35 to force down the free arm of the bell-crank lever 36. This movement of the free arm of the lever pulls the push-bar 37 inward and causes the brake-shoe 43 to press against the counting-wheel and prevent its recoil or rebound. At the same time the pin 28 engages the counting-pawl the extension 27 of the counting-arm presses against the upper end of the vertical bar 50 and, forcing it downward, causes the lifting-bar 52, which is pivoted to the opposite end of the oscillatory bar 49, to rise and disengage the hooked end of the latch 54 from the catch-plate 64. The latch 54 is brought quickly back by the tension force of the spring 62, which, acting upon the fulcrumed lever 55, pulls the rear portion of said lever against the spacer-stop 65 and causes the front portion of said lever to bring the lip 57 of the reciprocatory rod 56 into engagement with the cam 58. At the same time the lip 67 of the hinged latch 59 slips over one tooth of the rack on the under side of the spacer-bar and engages the preceding tooth, so that at the next revolution of the driving-shaft the cam 58 will force the reciprocatory rod 56 back to its first or normal position, out of engagement with the cam 58, as shown in Fig. 3, carrying with it the front end of the fulcrumed lever. As the cam 58 is moving the reciprocatory rod and front end of the lever back to its normal position the rear end of said fulcrumed lever will be moving in the opposite direction, pushing the latch 54 into position to again engage the stop-plate 64 and pulling the hinged latch to move the spacer-bar one tooth to space apart the coils. When the whole number of coils have been wound, the left end of the spacer-bar will have reached the lip 77 of the stop-lever 76, and pressing against said lip forces back the arm 76, which causes the bell-crank lever 72 to pull on the spring 74 and withdraw the stop 75 from engagement with the operating-lever, which on being released is pulled over by the tension force of spring 16, thereby disengaging the clutch from the band-pulley and stopping the machine. It will be noted that when pin 28 forces the pawl 30 out of engagement with the teeth of the counting-wheel the rear end of the pawl is raised and will be held in its raised position by the projection c on the spring-pressed arm 31 until the counting-wheel is returned to normal or starting position, which occurs when the lug 81 on the back of the counting-wheel strikes the free end of the brake-lever 32, forcing the free end of said brake-lever upward and the arm 34 inward, compressing the spring 33, and thereby forcing the pawl into engagement with the teeth of the counting-wheel, locking it against backward rotation. A stop d is secured to the frame to limit the upward movement of the brake-lever. If it is desired to space the coils one and a half inches apart, the space-bar should have the teeth of its upper and lower racks one and a half inches apart and the spacer-stop should be one and a half inches.

Having thus fully described my invention, what I claim, and desire to secure by Letters Patent, is—

1. In a machine for reeling twine, the combination with a counting-wheel, loosely mounted on a shaft and provided with an annular row of holes, of a counting-arm, also mounted on said shaft and provided with a slot, a screw for locking the counting-arm to the counting-wheel, whereby the number of coils to be wound may be regulated, and means for automatically resetting the counting-wheel.

2. In a machine for reeling twine, the combination with a counting-wheel, loosely mounted on a shaft and provided with an annular row of holes, of a counting-arm, also loosely mounted on said shaft and provided with a slot, a screw for locking the counting-arm to the counting-wheel, whereby the number of coils to be wound may be regulated, a spacer-bar, means for moving the spacer-bar, and means for automatically resetting the counting-wheel.

3. In a machine for reeling twine, the combination with a counting-wheel, loosely mounted on a shaft and provided with an annular row of holes, of a counting-arm, also loosely mounted on said shaft and provided with a slot, a screw for locking the counting-arm to the counting-wheel, whereby the number of coils to be wound may be regulated, a spacer-bar, means for moving the spacer-bar, means for automatically resetting the counting-wheel, and means for automatically stopping the machine when the required number of coils have been wound.

4. In a machine for reeling twine, the combination with a counting-wheel and means for rotating the same, of a counting-arm adapted to be locked to the counting-wheel at predetermined points, to regulate the number of coils to be wound, means for automatically resetting the counting-wheel, and means for preventing the recoil of said wheel.

5. In a machine for reeling twine, the combination with a counting-wheel and means for rotating the same, of a counting-arm adapted to be locked to said wheel at predetermined points, to regulate the number of coils to be wound, a spacer-bar, means for moving the spacer-bar, means for automatically resetting the counting-wheel, and means for preventing the recoil of said wheel.

6. In a machine for reeling twine, the combination with a counting-wheel and means for rotating the same, of a pawl arranged to prevent reverse movement of the counting-wheel, a counting-arm adapted to be locked to said wheel at predetermined points, means arranged on the counting-arm to disengage the pawl from the counting-wheel, means for automatically resetting said wheel, and means arranged to prevent the recoil of the counting-wheel.

7. In a machine for reeling twine, the combination with a counting-wheel and means for rotating the same, of a counting-arm adapted to be locked to the counting-wheel at predetermined points, a pawl arranged to prevent reverse movement of the counting-wheel, means arranged on the counting-arm to disengage the pawl from said wheel, means for automatically resetting the counting-wheel, and a brake mechanism arranged to prevent the recoil of the counting-wheel.

8. In a machine for reeling twine, the combination with a counting-wheel and means for rotating the same, of a counting-arm adapted to be locked to the counting-wheel at predetermined points, a pawl arranged to prevent reverse movement of the counting-wheel, means arranged on the counting-arm to disengage the pawl from said wheel, means for resetting the counting-wheel, a brake-lever and a brake, and mechanism arranged between the brake-lever and the brake, whereby said brake is operated to prevent the recoil of the counting-wheel.

9. In a machine for reeling twine, the combination with a counting-wheel and means for rotating the same, of a counting-arm adapted to be locked to the counting-wheel at predetermined points, a pawl arranged to prevent reverse movement of the counting-wheel, a spacer-bar, means for moving the spacer-bar, means arranged on the counting-arm to disengage the pawl from the counting-wheel, means for resetting said wheel, and a brake mechanism arranged to prevent the recoil of the counting-wheel.

10. In a machine for reeling twine, the combination with a counting-wheel and means for rotating the same, of a counting-arm adapted to be locked to the counting-wheel at predetermined points, a pawl arranged to prevent reverse movement of the counting-wheel, a spacer-bar, means for moving the spacer-bar step by step, means arranged on the counting-arm to disengage the pawl from the counting-wheel, means for resetting said wheel, a brake mechanism arranged to prevent the recoil of the counting-wheel, and means for automatically stopping the machine when the required number of coils have been reeled.

11. In a machine for reeling twine, the combination with a counting-wheel and means for rotating the same, of a counting-arm adapted to be locked to the counting-wheel at predetermined points, to regulate the number of coils to be wound, a spacer-bar, automatic means for moving the spacer-bar step by step, and automatic means for stopping the machine when the required number of coils have been wound.

12. In a machine for reeling twine, the combination of a rotatable toothed counting-wheel, a counting-arm adapted to be locked to said counting-wheel at predetermined points, to regulate the number of coils to be wound, means for preventing a reverse movement of the counting-wheel, means for automatically releasing said wheel, and a curved guide and a weight for insuring a rapid and positive return of the counting-wheel to normal or starting position.

13. In a machine for reeling twine, the combination of a rotatable toothed counting-wheel, a counting-arm adapted to be locked to said counting-wheel at predetermined points, to regulate the number of coils to be wound, means for preventing a reverse movement of the counting-wheel, means for automatically releasing said wheel, a curved guide and a weight for insuring a rapid and positive return of the counting-wheel to normal position, and means for preventing the recoil of said counting-wheel.

In testimony whereof I affix my signature in the presence of two witnesses.

A. JULIAN CRANDALL.

Witnesses:
HATTIE S. CRANDALL,
EDWARD G. CRANDALL.